Jan. 15, 1963 H. A. SHARPE 3,073,191
TUBELESS TIRE PATCHING TOOL
Filed Aug. 29, 1960
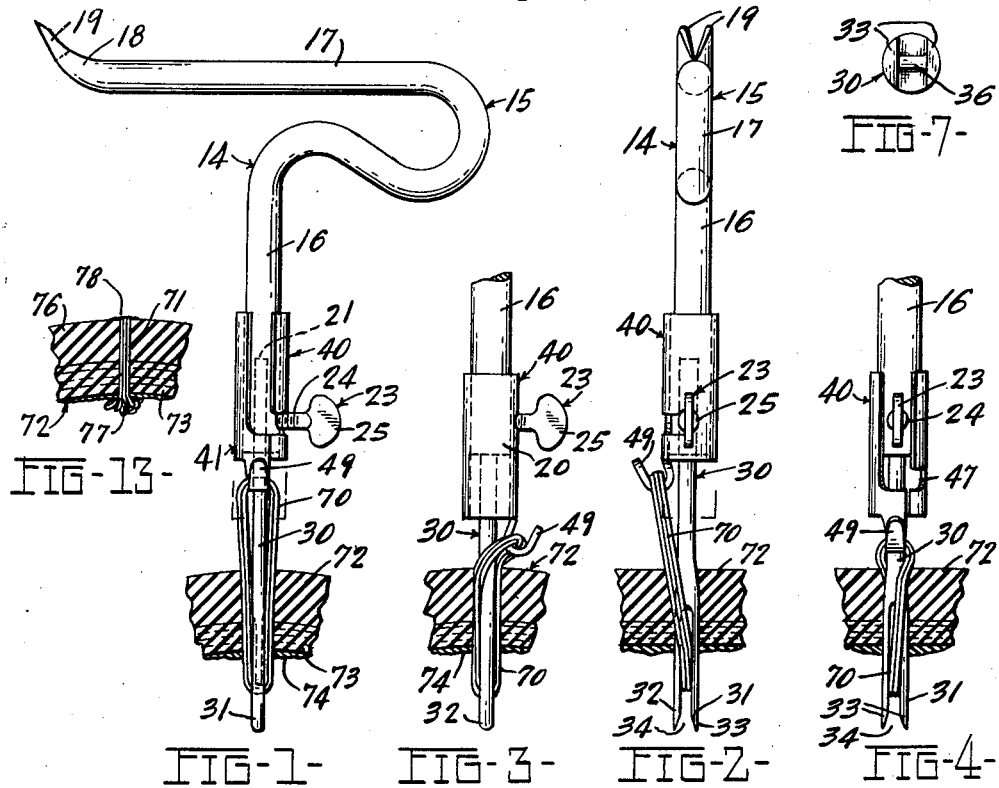
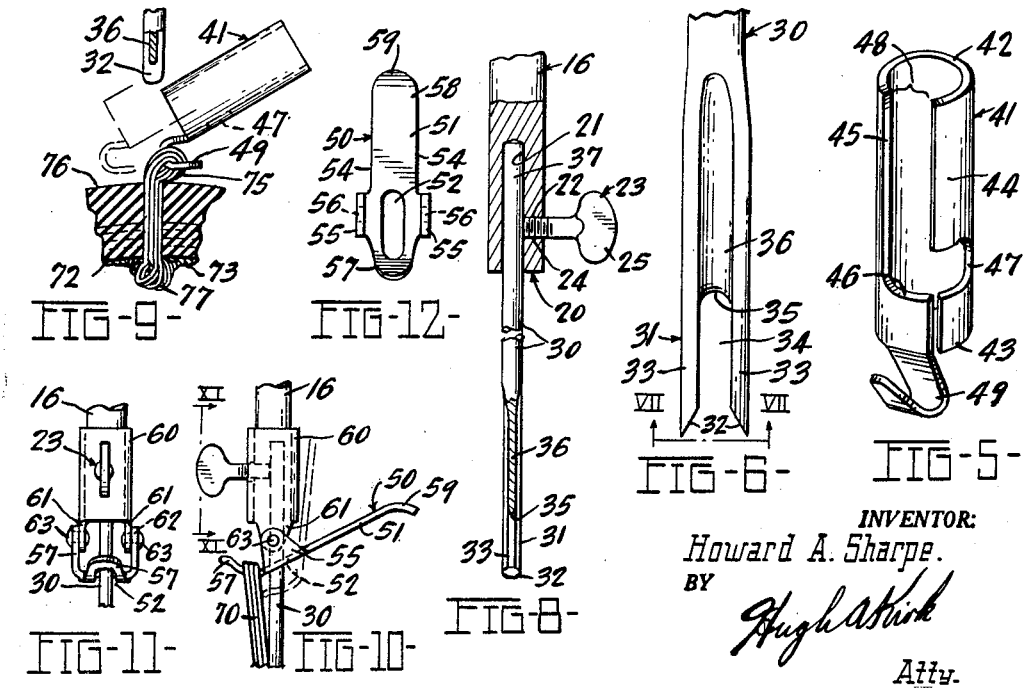
INVENTOR:
Howard A. Sharpe.
BY
Hugh A. Kirk
Atty.

United States Patent Office 3,073,191
Patented Jan. 15, 1963

---

3,073,191
TUBELESS TIRE PATCHING TOOL
Howard A. Sharpe, 2251 Grantwood Drive, Toledo, Ohio
Filed Aug. 29, 1960, Ser. No. 52,402
3 Claims. (Cl. 81—15.7)

This invention relates to tubeless tire patching tools. More particularly, it relates to tire patching tools for inserting a tensioned rubber band into the punctured tire casing and then for releasing the rubber band to contract within the casing to fill the puncture hole.

At present there are two basic types of tires used on American automobiles: those tire casings which require a pressurized and casing supporting inner tube, and a tubeless tire which is both the pressurized member and the road contacting member. These tubeless tires are fitted directly to the tire rim through the use of special sealing and contacting ridges molded into the tire casing itself. The inner toroidal surface of the tire frequently is coated with a layer of gum rubber to seal punctures which may occur during use of the tire. For very slight punctures, such as from wires or very small tacks, the gum rubber layer is quite sufficient to completely seal the puncture and prevent the loss of air from the tire. It is especially desirable in the use of tubeless tires to avoid removing the tire casing from the steel rim, in that continued rupturing or breaking of the joint between the casing sealing ridges and the rim seats increases the possibility that these ridges or ribs may be damaged and that an air-tight seal will not be accomplished when the casing is reinstalled on the rim. When a large nail or foreign object causes a puncture in the tubeless tire casing, quite often the gum rubber is not sufficient to completely seal such a casing, resulting in loss of air from the tire.

To provide for repair of such large punctures without removing the casing from the rim there have appeared in recent years a number of specialized tubeless tire repairing patch or plug and repairing tools. These repairing patches or plugs may take the form of specially prepared rubber rivets requiring a special tool or gun to put them into the casing, which plugs, when installed in the tread or sidewall of the tire casing, generally effectively seal the damaged portion of the tire. However, sometimes the tire needs to be re-balanced because of the added weight to a localized area of the tire. Also, such tools and rubber rivets or other specially prepared inserts for the tire are expensive and often difficult to obtain when needed on short notice, as is generally the case with tire repairs.

It is an object of this invention to provide a simple, safe, economic, efficient, and effective tire repairing implement which does not require the use of specially prepared tire sealing elements.

Another object of this invention is to provide a tire repairing process and implement for tubeless tires which is self-vulcanizing, does not require removal of the tire casing from the tire rim, is effective where a gum layer on the inside of the tire is not, and the use of which does not require that the tire be balanced after its repair.

Another object of this invention is to provide such a tire repairing implement whereby commonly obtainable rubber bands may be used to seal a puncture in a tire casing.

Still another object of this invention is to provide such a tire repair implement with a plurality of tire engaging needles or probes for use with various sized tire punctures to avoid stressing the tire casing more than is absolutely necessary during the repair process.

Generally speaking, this invention comprises a handle, a forked end piercer or needle which may be removably held in said handle, and a rubber band holding and releasing hook means attached to said handle. The handle comprises a shank portion and a manually graspable portion, and may be in the form of a steel bar bent in a T-shape, and may include as a part of the graspable portion a tack or nail removing pair of prongs or claws. Aligned with the shank portion of the handle and extending from the shank end of the handle into the handle, there may be a hole or socket. A strong steel needle or piercing means having a forked outer end has its inner end attached to the shank of the handle, such as by insertion into the hole in the end of the shank and held therein, such as by a set screw. Movably mounted to the shank portion of the handle is a rubber band tensioning, holding and releasing means which may comprise a hook or a slotted collar or a pivoted trigger. Not necessarily a part of the tool itself, but to be used with it, are elastic loops or rubber bands which are tensioned between the releasing hook and the forked end of the piercer or needle in such position to be stretched along the needle for insertion by the needle into the puncture hole in the tire casing to be repaired. Before the stretched rubber band or bands is inserted into the puncture, it preferably is dipped while stretched on and with the needle into an inflammable tire patching cement or adhesive. When the rubber bands are in place in the puncture, the hook on the shank of the tool is then released and the tool is removed leaving the expanded bands in the puncture hole. The outer ends of the band or bands may then be burned with a match or flame to vulcanize them to the outer tire casing surface.

The above mentioned and other features and objects of this invention and the manner of attaining them will become more apparent and the invention itself will be best understood by reference to the following description of embodiments of the invention taken in conjunction with the accompanying drawing, wherein:

FIG. 1 is a side elevational view of one embodiment of a rubber band-loaded implement of this invention showing it inserted into a puncture hole in a section of a tire casing;

FIG. 2 is a side elevational view of the implement as viewed from the right side of FIG. 1;

FIG. 3 is a fragmentary elevation of the implement of FIG. 1 showing the band tensioning, holding and releasing means in its rubber band relaxed position prior to release of the band and removal of the needle from the tire casing;

FIG. 4 is a view from the right side of FIG. 3 showing the slot release means of the sleeve tensioning mechanism;

FIG. 5 is an enlarged perspective view of the band tensioning and releasing sleeve or mechanism of FIG. 1 showing its bayonet type locking slot and band engaging hook;

FIG. 6 is a further enlarged view of the forked or tire casing piercing end of the band holding needle or piercer of the implement of this invention as shown in FIGS. 1–4;

FIG. 7 is an enlarged end view of the forked end of the piercer or needle as taken along line VII—VII of FIG. 6;

FIG. 8 is an enlarged, partially sectioned, and fragmentary view of the needle of FIGS. 1–4 showing how it is held in a socket in the shank of the handle by a thumb set screw;

FIG. 9 is a sectional view of the tire casing similar to that in FIGS. 1–4 showing the end of the needle removed from the puncture hole in the tire casing and the retracted rubber band held in said puncture hole with the released band engaging means ready to be removed or unhooked from the outer looped ends of the rubber band as shown in dotted lines;

FIG. 10 is a fragmentary elevation of another embodiment of a band holding tensioning and releasing mechanism, for the implement shown in FIG. 1, showing the band in its loaded position and with the dotted lines representing the mechanism in its band-released position;

FIG. 11 is a fragmentary elevation of the left side of the band releasing mechanism of FIG. 10 taken along line XI—XI thereof;

FIG. 12 is an elevational view of only the trigger type band releasing mechanism illustrated in FIGS. 10 and 11; and FIG. 13 is a cross-sectional view of the tire casing similar to that shown in FIGS. 1-4 and 9, showing the tire repaired with a rubber band as performed by the implement of this invention.

The largest and basic element of the tool 14 of this invention is a handle 15 (see FIGS. 1 through 4) which has a straight shank portion 16 and a manually graspable portion 17. The handle 15 may be formed into a T-shape relative to the shank portion 16 by bending a round steel bar. The free end 18 of the hand grip portion 17 may be formed to include a pair of tack or nail removing claws 19. While a preferred form of the handle 15 of this invention is the T-shape shown in FIG. 1, the handle 15 may be straight or curved into any convenient and easily held configuration or may be molded or formed of another piece of material and attached to the upper end of the shank 16.

The free end 20 of the handle shank 16 may have a socket or hole 21 drilled longitudinally thereof to accommodate the needle 30 to be described later (see FIG. 8). Drilled from one side of the shank 16 to the longitudinal socket or hole 21 and a short distance adjacent the free shank end 20 is a tapped hole 22. A set screw 23 is engaged in hole 22 which screw has a threaded shank 24 and may be of the thumb type having a broadened finger engageable blade 25 opposite the threaded end 24.

Inserted into the socket hole 21 and held by the thumb set screw 23 is a steel needle 30 of substantial cross-section, preferably circular, having a forked 31 lower end 32. The legs or tines 33 of this fork 31 encompass a smoothly rounded recess 34 open to the extreme lower end of the needle 30. The legs 32 of the eye or yoke 34 of the needle 30 may be bevelled outwardly from the eye 34 to form a sharpened edge at the extreme lower end of the legs 33 (see FIG. 6). Adjacent the closed upper extremity 35 of the needle recess 34, the needle preferably has a pair of complementary elongated recesses extending upwardly along the needle to form a web 36, which serves to pocket the tensional rubber bands during the insertion of the needle into the puncture hole in a tire casing. The upper socketed end 37 of the needle 30 is preferably plain but may include a flattened portion (not shown) to provide a locking seat for the set screw 23.

Movably connected to the shank 16 of handle 15 is a rubber band holding, tensioning, and releasing means of which two embodiments are shown herein.

One embodiment 40 of this rubber band holding, tensioning and releasing means comprises a cylindrical sleeve 41 open at both of its ends 42 and 43 (see FIG. 5). Extending longitudinally of the body 44 of this cylindrical sleeve 40 is a bayonet type slot 45 extending from the upper end 42 a portion of the way to the opposite or lower end 43. At the lower end 46 of slot 45 is a slot extension 47 extending at right angles to the main longitudinal slot 45. The width 48 of both slot 45 and its extension 47 should be greater than the diameter of shank 24 of set screw 23. The lower end 43 of the sleeve 41 includes a hook 49 extended therefrom opening radially outwardly from the axis of the cylindrical sleeve 41. The surfaces of hook 49 should be smoothly finished to be free of burrs and sharp edges to prevent cutting of the rubber band tensioned thereby.

Another embodiment of the rubber band holding and releasing means may be in the form of a trigger 50 comprising essentially a flat body 51 (see FIGS. 10, 11 and 12) having a longitudinal slot 52 adjacent its lower end 53. The width of slot 52 should be greater than the diameter of the largest needle 30 which may be accommodated with the tool 14 of this invention. Bent upwardly from the sides 54 of trigger body 51 adjacent needle slot 52 are a pair of lugs 55, each having an aperture 56 aligned with the aperture 56 of the other lug 55. The lower end 53 of the trigger 50 may be bent in the same direction as lugs 55 to form a band engaging hook 57. The upper end 58 of the trigger body 51 may be flat, but preferably it is bent into a finger engageable tab 59 extending oppositely from the rubber band hook 57. When the trigger 50 of upper band holding and releasing means is used, a sleeve 60 may be attached to the end of handle shank 16 by the set screw 23 or may be rigidly attached thereto such as by brazing or by welding, with the tapped set screw hole 22 extending through sleeve 60. This sleeve 60 may have a pair of oppositely disposed parallel downwardly extending lugs 61, each lug 61 having an aperture 62 therein aligned with the identical aperture 62 of the opposite lug 61. In trigger 50, lugs 55 may be pivotally mounted to the lugs 61 of sleeve 60 by loosely fitting rivets 63. When the trigger 50 type rubber band releasing mechanism is used, instead of using the sleeve 60, there may be provided a pair of pins (not shown) extending diametrically outwardly from the shank 16 as trunnions for pivoting the lugs 55 of trigger 50.

Thus far all of the components of the tool of this invention have been described; however, in using this tire patching tool 14 an elastic loop or rubber band 70 is needed. The operation of this tire repair tool requires first that the needle 30 be inserted into its socket 21 and fixed therein by the set screw 23. When the rubber band holding and releasing means 40 takes the form of the movable sleeve 41, the sleeve 41 is positioned on the shank 16 with the set screw 23 lying in slot extension 47 (see FIGS. 1 and 2); when the trigger 50 is used, the trigger 50 is positioned so that the hook 57 opens outwardly towards the manually graspable portion 17 of handle 15 (see FIGS. 10 and 11). A rubber band 70, preferably of rather substantial size, both in width and thickness as well as perimeter, is then stretched and looped or wound between the notch 34 of forked end 31 of the needle 30 and the releasing means hook 48 or 57. Care must be taken that as much tension as is possible is provided to the rubber band 70 at this point. At this point the tool 14 is ready for use in patching a puncture or hole 71 which may exist in tire casing 72 shown in section throughout the various figures attendant to this description. The inner surface 73 of the tire casing 72 may have thereon a layer of gummed rubber 74.

Prior to the loading of the rubber band 70 on the tool 14, the direction of the puncture hole 71 should be tested or probed by needle 30 so that when the actual repairing process is performed it may be done as rapidly as possible. When the direction of the puncture 71 has been properly ascertained, that portion of the tensioned rubber band lying adjacent the needle 30 should be infused, dipped into or saturated with regular inflammable tire patching cement. The loaded tool 14 with the stretched and doped rubber band is then quickly forced into the puncture 71 until the eye or recess end 35 of needle 30 has passed beyond the inner surface 73 of tire casing 72 (see FIGS. 1 and 2). The rubber band holding mechanism is then activated to release the tension on rubber band 70. When the slotted sleeve 41 (as shown in FIG. 5) is used, the sleeve 41 is twisted to free the set screw shank 24 from slot extension 47 so that the tension of the rubber band 70 will move the sleeve 41 relative to the set screw 23 in the longitudinal slot 45 and free the sleeve 40 from the shank 16 (see FIGS. 3 and 4). When the trigger form 50 of the rubber band releasing mechanism is used, the trigger 50 is moved about pivot axles 63 to release the rubber band 70 from hook 57 (as shown in dotted lines in FIG. 10). The needle 30 is then extracted from the tire casing 71. The cement coating on the portion of the rubber band 70 held in the tire 72 provides lubrication between the rubber band 70 and the needle 30, but the rubber-to-rubber friction between the rubber band 70 and the casing 72 is sufficient to maintain the rubber band 70 in the puncture 71 (see FIG. 9). If the sleeve form 41 of the rubber band releasing mechanism 40 is used, the handle 15 and needle 30 can then be completely withdrawn from the sleeve 41 and the hook 48 of the sleeve 41 can then be easily unhooked from the loops 75 of the rubber band 70 formed adjacent the outer surface 76 of the tire casing 72 (see FIG. 9). At this point the looped rubber band 70 will be tightly compressed within the puncture 71 since the tire casing 72 will have been expanded by the insertion of the needle 30, and a plurality of rubber band loose loops 77 will exist adjacent the interior surface 73 of the tire casing 72 similar to the loops 75 on the outside of the casing.

Since the contraction of the tire casing 72 squeezes the rubber band lengths between the loops 75 and 77 together, some of the excess of the inflammable rubber cement will be squeezed out against the upper surface 76 of the casing 72. This excess cement is then set afire to melt and fuse together the exterior loops 75 of the rubber band 70, to form a smooth button 78 (see FIG. 13) on the outer surface 76 of the tire. The action of the heat produced by the burning of the loops 75 into the button 78 vulcanizes the rubber band 70 for a considerable extent into the tire casing 72, thereby producing an extremely effective and long lasting seal of the tire puncture. Thus a punctured tire may be repaired without removing the tire casing 72 from its rim. Where the tire to be repaired is a tubeless tire, the presence of the gum rubber layer 74 on the interior of the tire adjacent the tread acts to further increase the effectiveness of the repair performed by the tool 14 of this invention.

A plurality of different diameter needles 30 may be provided with the handle 15 of this invention so that the tire casing is not unduly stretched to produce cracks adjacent the puncture 71, which cracks may at a later date mature into an irrepairable rupture in the tire casing. However, the needle 30 to be used with any given tire repairing job should be of a diameter sufficient to require some force to insert it into the tire casing through the puncture hole, since it is necessary that the casing itself be stretched also, so that, when the needle 30 is retracted from the puncture 71, the casing 72 will contract tightly around the lengths of the rubber band loops deposited in the puncture 71.

For the practical use of this invention, it is not necessary that specially prepared rubber bands 70 be used; however, soft India rubber bands are recommended since these are most readily acted upon by the easily obtainable tire patching cement employed in tire patching processes. If this tool 14 is to be used upon tubeless tires having a self-sealing inner layer 74 of gum rubber, the inflammable liquid rubber cement may not be necessary to produce an effective seal of the puncture. This is because the presence of the rubber band loops in the puncture itself often provide an adequate base for the gum rubber layer 74 to act as it normally would in the presence of a very small puncture even when the puncture is caused by a large nail or spike.

Because of the light weight of the rubber bands 70 which are used in a tire repair of this nature, the addition of this small weight to a particular area of a tire is negligible, meaning that the tire need not be re-balanced after a repair of this nature has been made.

While there is described above the principles of this invention in connection with specific apparatus, it is to be clearly understood that this description is made only by way of example and not as a limitation to the scope of this invention.

What is claimed is:

1. A tubeless pneumatic tire patching tool comprising: a shank, a handle at one end of said shank, a socket in the other end of said shank, a piercer having a forked end projecting from said socket, a set screw in said shank to anchor said piercer in said socket, a removable sleeve on said shank movable longitudinally thereof and having limited rotary movement with respect thereto, a hook integral with said sleeve, an open ended bayonet slot in said sleeve cooperating with said set screw to slide longitudinally of said shank over said set screw and then to rotate to lock said sleeve in position to stretch a band of elastic material between said forked end and said hook to be inserted in a hole in said tire by said piercer, said sleeve being rotatable to unlocked position for releasing the stretch in said band when it is in said hole so the piercer may be withdrawn from said hole without said sleeve and said band so that said band will expand to seal said hole, and so that said hook on said sleeve will be easily disengaged from the now unstretched looped end of said band.

2. A tool according to claim 1 wherein said forked end of said piercer is outwardly bevelled to form a sharp piercing edge.

3. A tool according to claim 1 wherein said piercer has a longitudinal groove extending from the crotch of its forked end to provide space for said stretched elastic band.

References Cited in the file of this patent

UNITED STATES PATENTS

| 604,768 | La Clair | May 31, 1898 |
| 616,109 | Kelly et al. | Dec. 20, 1898 |
| 713,006 | Kimberlin | Nov. 4, 1902 |
| 789,931 | Pawasarat | May 16, 1905 |
| 1,385,591 | Stafiej | July 26, 1921 |
| 1,472,812 | Pawsat | Nov. 6, 1923 |
| 2,312,869 | Boyer | Mar. 2, 1943 |
| 2,630,303 | Krucker | Mar. 3, 1953 |